R. LUNDELL.
DYNAMO ELECTRIC MACHINE.
APPLICATION FILED AUG. 30, 1918.
1,401,996.
Patented Jan. 3, 1922.
2 SHEETS—SHEET 1.
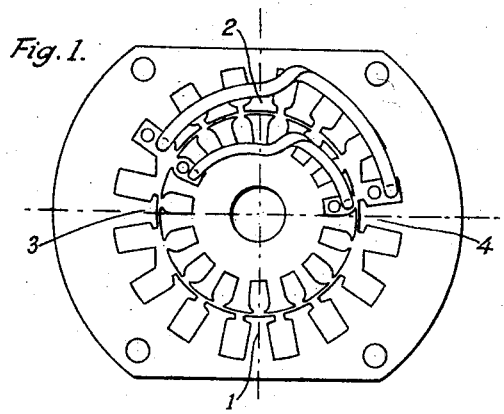
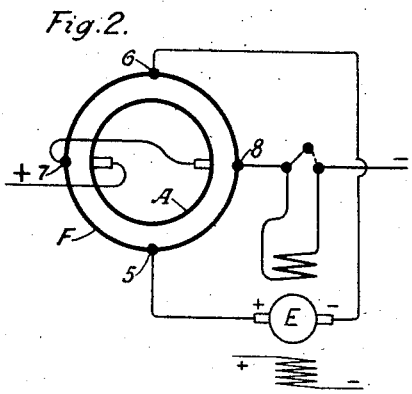
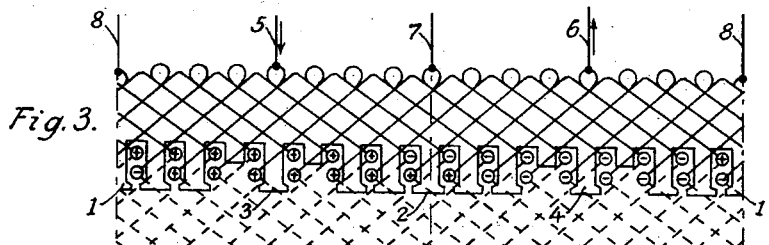
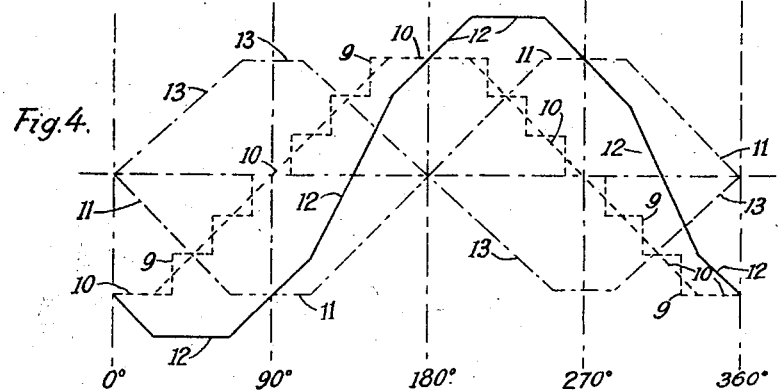
Inventor
Robert Lundell
By his Attorney
Gorham Crosby R. LUNDELL.
DYNAMO ELECTRIC MACHINE.
APPLICATION FILED AUG. 30, 1918.
1,401,996.
Patented Jan. 3, 1922.
2 SHEETS—SHEET 2.
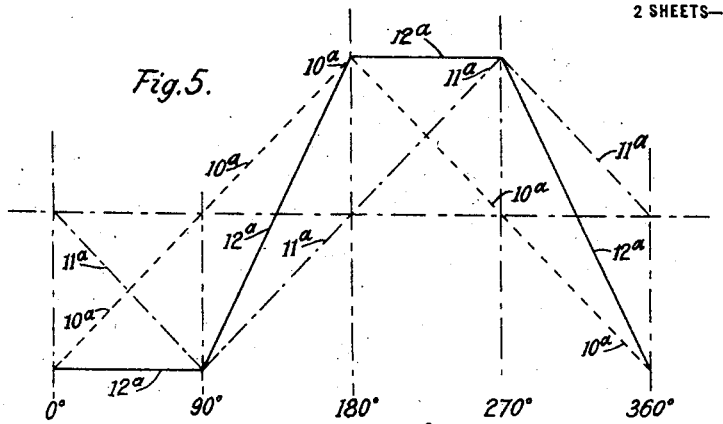
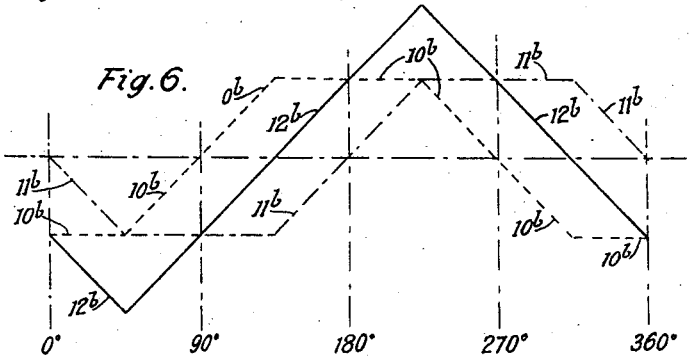
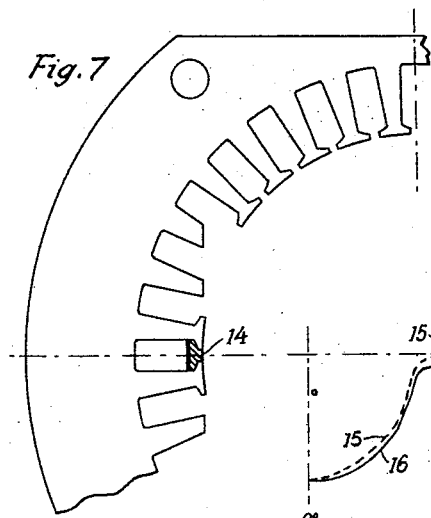
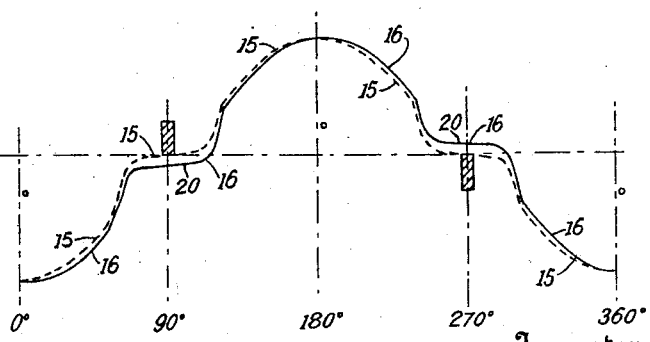
Inventor
Robert Lundell
By his Attorney
Gorham Crosby

UNITED STATES PATENT OFFICE.

ROBERT LUNDELL, OF NEW YORK, N. Y.

DYNAMO-ELECTRIC MACHINE.

1,401,996.   Specification of Letters Patent.   Patented Jan. 3, 1922.

Application filed August 30, 1918. Serial No. 252,009.

*To all whom it may concern:*

Be it known that I, ROBERT LUNDELL, a citizen of the United States, and a resident of New York city, in the county of New York and State of New York, have invented certain new and useful Improvements in Dynamo-Electric Machines, of which the following is a specification.

My invention relates to dynamo electric machines and it is particularly advantageous in connection with fully compensated machines, for example, as described in my U. S. Letters Patent Numbers 857184, 1117872 and 1127464.

According to my invention in its preferred form I provide a simple form of evenly distributed field winding of the drum- or the barrel-type, having a coil-pitch of less than full pitch and arranged in such a manner that said winding may be supplied with two distinct sets of current inlets and outlets for the purpose of utilizing one and the same winding for excitation as well as for compensation or over-compensation. I further connect the individual coils in said winding so that the distribution curves of the magneto-motive forces in the various portions of said winding will approximate as closely as possible true sinusoidal curves, so as to make it possible for the various magneto-motive forces in the windings to add up properly, forming resultant forces of correct magnitude and wave form. I aim especially to avoid the triangular distribution form of the magneto motive forces in the active conductors of the distributed windings. I also obtain for machines of the above mentioned class a comparatively wide neutral field at the points where the magnetic lines of force change direction with a resultant flat field for commutation at these points. Many different types of windings have been evolved in the attempt to cause the distribution curves of the magneto-motive forces to coincide as closely as possible with the true sinusoidal wave form. The coils have sometimes been placed in unevenly spaced slots or, if the slots are evenly spaced, certain slots are then left empty. These arrangements are unsymmetrical or wasteful of space.

Further and more specific objects, features and advantages will more clearly appear from the detail description given below taken in connection with the accompanying drawings which form a part of this specification.

In the drawings Fig. 1 illustrates the field and the armature stampings of a laminated form of bi-pole motor or generator, embodying my improvements is one form. The figure shows one field and one armature coil of similar type which is known in the art as the diamond-shaped coil for drum windings. Fig. 2 represents diagrammatically the circuit connections for the bi-polar fractional pitch field winding which is shown in full development in Fig. 3. Fig. 3 shows in addition to the said winding, the developed teeth and slots of the field structure shown in Fig. 1.

Fig. 4 represents the distribution curves of magneto-motive forces produced by the field windings illustrated in Figs. 1 and 3.

Fig. 5 is a similar diagram showing the curves of magneto-motive forces due to full coil-pitch windings.

Fig. 6 is a simliar diagram showing the curves of magneto-motive forces due to windings of 50% of full coil-pitch.

Fig. 7 illustrates a portion of a field structure having twice as many teeth and slots as the one shown in Fig. 1.

Fig. 8 represents diagrammatically the resultant flux distribution at no load and full load, as obtained from the distribution curves of the magneto-motive forces indicated in Fig. 4 and taken in conjunction with the iron structure illustrated in either Fig. 1 or Fig. 7.

Referring now to the figures in detail— Fig. 1 illustrates a bi-polar field structure having 16 evenly spaced teeth and slots on its inner periphery with the exciting pole-centers located at 1 and 2 and the commutation poles at 3 and 4 where the magnetic lines of force change direction. It will be observed that the teeth 3 and 4 have the appearance of interpoles because the adjacent teeth on each side of the same have been partly cut off and these teeth really serve as interpoles without the aid of special windings around the same. The field coil shown in Fig. 1 embraces six teeth only instead of eight which would correspond to a full pitch winding. The coil-pitch in this case is therefore $=\frac{6}{8}=75\%$ of full pitch. The armature illustrated in the figure has 15 teeth and the armature coil embraces six teeth instead of seven and one half which would be required by a full pitch winding. The coil-pitch of the armature is therefore $=\frac{6}{7.5}=$ 80% of full pitch.

Fig. 2 is a bi-polar connection-diagram for a motor or generator of the type referred to. In this figure A represents the drum winding for the armature, F a similar drum winding for the field and E represents a separate exciter furnished with shunt and series field windings as indicated in the figure, so that the main dynamo electric machine may be run as a straight series machine or a separately excited machine, or a compounded machine, according to the connections of the shunt or series field windings of the exciter. The main current field connections are so located at 7 and 8 relative to the position of the brushes that the axis of the field-magnetization due thereto will coincide with that of the armature, the two magnetizations being in opposition to one another. The other current inlet 5 and outlet 6 employed for the main excitation are located at 90 electrical degrees from the other set, as clearly shown in the diagram.

Fig. 3 shows diagrammatically a development of the teeth and the slots illustrated in Fig. 1 in combination with a complete drum winding for the same having a coil-pitch of 75% or the same as shown in Fig. 1. The two sets of current inlets and outlets, viz: 5—6 and 7—8 shown in Fig. 3, correspond with the current inlets and outlets similarly numbered in Fig. 2. Assuming that a current for excitation from the exciter E in Fig. 2 is flowing through the field winding by means of the inlet 5 and the outlet 6 as indicated by the arrows in Fig. 3, the active conductors in the slots of the field structure will carry currents flowing in certain directions as shown by the plus and the minus signs in the figure. That is to say, these plus and minus signs indicate, respectively, that the current is flowing away from or toward the observer, according to usual practice.

The direction and the relative amount of the current in the various active conductors being determined the corresponding zigzag line 9, 9 in Fig. 4 is obtained which represents the distribution curve of the magneto-motive forces due to this excitation current only. Substituting the mean straight line 10, 10 for the zigzag line 9, 9, according to usual practice, the distribution curve 10, 10, 10, is obtained, which curve, with its base line forms a distribution diagram of the magneto motive forces in the active conductors of the excitation winding substantially similar to a trapezoidal figure having one of its parallel sides considerably shorter than or about one-fourth the length of the opposite side; that is, the distribution of the magneto motive forces takes the form of a triangle with its top cut off parallel to its base line. Assuming now that the main current, which flows through the armature and the field winding by means of the other set of field-connections 7 and 8, is of the same amperage as the excitation-current, a similar distribution curve 11, 11, 11 is obtained which is located at 90 electrical degrees from the former as shown by Fig. 4. The two curves 10, 10, 10 and 11, 11, 11 added together give a new distribution curve 12, 12, 12 which represents the magneto-motive forces due to the two currents or current components which flow through the field winding. It will be observed that the resultant distribution curve 12, 12, 12 coincides quite closely with the sinusoidal form which might, in fact, be expected because the original curves did not greatly deviate from the sinusoidal form.

Figs. 5 and 6 indicate the distribution curves of the magneto-motive forces as they would appear if the field winding were composed of coils having, respectively, full coil-pitch and 50% of full coil-pitch. These diagrams are shown for the sake of comparison and are drawn to correspond with the distribution curves of Fig. 4 in every respect, that is to say, the number of coils, turns per coil and amperage is supposed to be the same, the only difference being the pitch of the coils. Distribution curve $10^a$, $10^a$, $10^a$ in Fig. 5 corresponds, therefore, with the distribution curve 10, 10, 10 in Fig. 4, but is triangular in form because it has been obtained from a full pitch drum winding. Distribution curve $11^a$, $11^a$, $11^a$ in Fig. 5 corresponds, likewise, with curve 11, 11, 11 in Fig. 4. The resultant distribution curve $12^a$, $12^a$, $12^a$, in Fig. 5 has, however, changed its contour materially as compared with the two original distribution curves and deviates considerably from the sinusoidal form.

Fig. 6 illustrates in precisely the same manner the original distribution curves $10^b$, $10^b$, $10^b$ and $11^b$, $11^b$, $11^b$ as well as the resultant distribution curve $12^b$, $12^b$, $12^b$ which are all due to a drum winding having a coil-pitch of only 50% of the full pitch. It will be noticed from this figure that the resultant curve has become triangular and that there is too great a difference in form between the original and the resultant curves. In other words, the curves do not add up properly like sinusoidal curves and the arrangement of a drum winding having coils of 50% pitch becomes, like the full pitch winding, very much inferior to the 75% pitch winding described above.

Referring to the armature winding it will be seen by Fig. 1 that the angle between the active conductors of the armature coil is larger than the angle between the extreme points of the five teeth which collectively constitute one of the poles. This is important in connection with a fractional pitch armature winding. Obviously it becomes important to so increase the air-gap, at the places where the active conductors are being commutated, that the magnetic lines of force, at these places are reduced to the proper density.

Curve 13, 13, 13 in Fig. 4 represents the distribution of the magneto-motive forces in the armature winding. This curve is drawn to correspond with the other curves of the figure. It may be assumed, for instance, that the following windings are employed:—a field winding composed of 16 coils with 16 turns per coil, and wound as a fractional pitch drum winding having 75% of full pitch, an armature winding composed of 15 coils, 15 turns per coil, and wound as a fractional pitch drum winding having 80% of full pitch. These windings produce clearly a certain amount of over-compensation, which in turn produces the commutating field indicated at 20 in the curve 16, 16, 16 of Fig. 8. This curve represents the induced flux across the air-gap and is obtained from the curves of magneto-motive forces, as shown in Fig. 4, taken in conjunction with the magnetic circuit as illustrated by Fig. 1. The dotted curve 15, 15, 15 in Fig. 8 represents the induced flux across the air-gap at no load and the difference between the two curves at the commutation places indicates the relative value of the commutating fields. It will be seen from Fig. 1 that there is a great increase in the air-gap at or near the extreme ends of the teeth which constitute the main or exciting pole-corners and that the air gap is again gradually decreased toward the teeth which serve as inter-poles. That is, certain teeth act as main poles and certain teeth as interpoles, and certain teeth adjacent to the interpoles are magnetically cut away on a bevel or obliquely with reference to the periphery of the armature to produce a gradual increase in the reluctance of the magnetic path, away from the interpoles and toward the exciting poles. By the term magnetically cut away I mean that the teeth are cut away or reduced in size in a manner that will materially affect the reluctance of the magnetic circuit at these points, which may conveniently be accomplished either by cutting off the teeth in all of the laminations as shown, or by leaving a small percentage of the laminations with uncut teeth (to serve as coil-wedge holders), the greater percentage of the laminations having the teeth in this case cut off somewhat deeper than shown in the drawings. This change in the air-gap is made for the distinct purpose of counteracting the relative density of the lines of force across the air-gap, so that the commutation field will be as flat as possible as indicated as 20 in Fig. 8. That is to say, the air-gap is made larger where the density otherwise would be the greatest and is gradually reduced toward the places where the density of lines of force diminishes before they change direction. This feature of my invention is also clearly illustrated in Fig. 7. This figure shows in addition means for causing two or more teeth to serve as one interpole, which may become necessary in a large machine having a great number of teeth per pole.

I employ for this purpose a simple iron wedge 14 extending the whole length of the field structure, which causes the two teeth to become magnetically connected or short-circuited, resulting in an equalization of the magnetism in said teeth.

I have shown, for the sake of simplicity, a bi-polar machine but the invention has really greater utility in connection with multipolar machines. In connection with the latter, two-circuit or so called series-windings may in certain cases be employed especially for the armatures, but it will often be found advantageous to employ well known forms of multi-circuit or so called parallel windings and my improvements are not to be in any manner limited to bi-polar construction or two-circuit windings. It will also be understood that my invention in its broader aspects is not limited to the use of the same field coils for both excitation and for compensation of the armature reaction since it is obvious that two separate windings may equally well be employed for this purpose. However, certain important advantages are obtained by having the same winding carry both the excitation current and the current for compensation of the armature reaction.

Likewise many other changes and modifications may be made and the invention embodied in widely differing forms without departing from the spirit and scope thereof in its broader aspects.

What I claim as new and desire to secure by Letters Patent, is:—

1. A dynamo electric machine provided with a plurality of distributed field coils per pole for excitation and a plurality of distributed field coils per pole for compensation of the armature reaction, all of said field coils being of the type used for drum windings and having a pitch between the active conductors of each coil of less than full pole-pitch, said field coils being connected to produce, when energized by either a current for excitation or a current for compensation, a distribution of the magneto motive forces in the active conductors of said field coils substantially similar to a trapezoidal figure having one of its parallel sides considerably shorter than the opposite side.

2. A dynamo electric machine provided with a plurality of field coils per pole connected to form distributed field windings of the drum type for excitation and for compensation of the armature reaction, said field coils having a pitch between their active conductors of less than full pole-pitch but more than one half of the pole-pitch and producing, when energized by either a current for excitation or a current for compensation, a distribution of the magneto motive forces in the active conductors of said field coils substantially similar to a trapezoidal figure having one of its parallel sides considerably shorter than the opposite side.

3. A field magnet for a dynamo electric machine provided with a plurality of coils per pole connected to form distributed field windings of the drum type for excitation and for compensation of the armature reaction, said coils having a short polar pitch between their active conductors and producing, when energized by either a current for excitation or a current for compensation, a distribution of the magneto motive forces in the active conductors of said coils substantially similar to a trapezoidal figure having one of its parallel sides about one fourth the length of the opposite side.

4. A dynamo electric machine having a single distributed field winding of the drum type for both excitation and for compensation of the armature reaction, means for introducing into said winding a current for excitation and another current for compensation, said field winding being composed of a plurality of coils per pole, each coil having a short polar pitch between its active conductors and all of said coils producing, when energized by either a current for excitation or a current for compensation, a distribution of the magneto motive forces in the active conductors of said coils substantially similar to a trapezoidal figure having one of its parallel sides considerably shorter than the opposite side.

5. A dynamo electric machine having a drum wound armature with its coils connected to a commutator, a plurality of field coils per pole connected to form distributed field windings of the drum type for excitation and for compensation of the armature reaction, all of said armature and field coils having a short polar pitch between their active conductors and producing, when energized, distribution diagrams of the magneto motive forces in the active conductors of (a) the armature coils, (b) the exciting coils and (c) the compensating coils, substantially similar to three trapezoidal figures, each figure having one of its parallel sides considerably shorter than the opposite side.

6. A dynamo electric machine provided with a laminated field structure having substantially evenly spaced teeth and coil-slots, a plurality of coils per pole distributed in said slots for excitation and for compensation of the armature reaction, said coils being of the type used for drum windings and each coil having a short polar pitch between its active conductors, with connections for introducing into said field coils a current for excitation and other connections for introducing a compensating current, each of said currents producing, respectively, a distribution of the magneto motive forces in the active conductors of said coils substantially similar to a trapezoidal figure having one of its parallel sides about one fourth the length of the opposite side.

7. A dynamo electric machine provided with a laminated field structure having substantially evenly spaced teeth and coil-slots, substantially evenly distributed coils of the type used for drum windings on said field structure having a coil-pitch of less than full pole-pitch but greater than 50% of the full pitch and connections to said coils for introducing an exciting current causing certain teeth to act as main poles and other connections for introducing a current for over-compensation of the armature reaction causing the teeth midway between the main pole centers to act as interpoles, with certain teeth adjacent to the interpoles being magnetically reduced in size.

8. A dynamo electric machine provided with a laminated field structure having substantially evenly spaced teeth and coil-slots, distributed field coils placed therein for excitation and for compensation of the armature reaction, said coils being of the type used for drum windings and having a coil-pitch of less than full pole-pitch but more than 50% of the full pitch, certain of said teeth being cut away to form commutation places.

Signed at New York city, in the county of New York and State of New York this 29th day of August, A. D. 1918.

ROBERT LUNDELL.